US008451366B2

(12) United States Patent
Nakano et al.

(10) Patent No.: US 8,451,366 B2
(45) Date of Patent: May 28, 2013

(54) IMAGE CAPTURING DEVICE WITH AUTOMATIC FOCUS FUNCTION

(75) Inventors: Kanako Nakano, Fuchu (JP); Ken Fujita, Mitaka (JP); Daisuke Uematsu, Fussa (JP); Tasuku Muto, Kokubunji (JP)

(73) Assignee: Casio Computer Co., Ltd, Tokyo (JP)

( * ) Notice: Subject to any disclaimer, the term of this patent is extended or adjusted under 35 U.S.C. 154(b) by 399 days.

(21) Appl. No.: 12/797,746

(22) Filed: Jun. 10, 2010

(65) Prior Publication Data
US 2010/0315526 A1 Dec. 16, 2010

(30) Foreign Application Priority Data

Jun. 15, 2009 (JP) .................. 2009-142241

(51) Int. Cl.
G02B 13/16 (2006.01)
H04N 5/225 (2006.01)
(52) U.S. Cl.
USPC ............ 348/335; 348/340; 348/345; 348/348
(58) Field of Classification Search
USPC ............... 348/335, 340, 345, 348; 396/79–82
See application file for complete search history.

(56) References Cited

U.S. PATENT DOCUMENTS

| 2006/0140612 A1 | 6/2006 | Yata |
| 2007/0160359 A1 | 7/2007 | Imamura |
| 2008/0136958 A1* | 6/2008 | Nakahara ..................... 348/345 |

FOREIGN PATENT DOCUMENTS

| JP | 2006184742 | 7/2006 |
| JP | 2006-227080 | 8/2006 |
| JP | 2007178576 | 7/2007 |

OTHER PUBLICATIONS

Japanese Office Action for Japanese Patent Application Serial No. 2009-142241 mailed on May 24, 2011.

* cited by examiner

Primary Examiner — Yogesh Aggarwal
(74) Attorney, Agent, or Firm — Turocy & Watson, LLP

(57) ABSTRACT

An image capturing device includes an image capturing unit, a detection unit, an area setting unit, and a focusing unit. The image capturing unit captures an image. The detection unit detects a shape of an image area of an observed subject to be focused in the captured image. The area setting unit sets one or more contrast evaluation areas according to the shape of the detected image area. The focusing unit causes the image capturing unit to focus based on image data in the set contrast evaluation areas.

21 Claims, 7 Drawing Sheets

IMAGE CAPTURING DEVICE WITH AUTOMATIC FOCUS FUNCTION

CROSS-REFERENCE TO RELATED APPLICATIONS

This application is based upon and claims the benefit of priority from prior Japanese Patent Application No. 2009-142241, filed Jun. 15, 2009, the entire contents of which are incorporated herein by reference.

BACKGROUND OF THE INVENTION

1. Field of the Invention

The present invention relates generally to an image capturing device with an automatic focus function, a method and program for controlling an image capturing device with an automatic focusing function.

2. Description of the Related Art

Conventionally, in an automatic focusing (AF) process of digital cameras, a technique of setting a plurality of AF areas in an image capture frame (Jpn. Pat. Appln. KOKAI Publication No. 2007-178576, for example), and a technique of tracking a subject and automatically focusing the subject (Jpn. Pat. Appln. KOKAI Publication No. 2006-184742, for example) have been known.

In the technique disclosed in Jpn. Pat. Appln. KOKAI Publication No. 2007-178576, however, AF areas are set in predetermined positions in an image capture frame, and the AF areas are set irrelevant of the shape of a specific subject to be automatically focused. Further, the technique of Jpn. Pat. Appln. KOKAI Publication No. 2007-178576 does not set a plurality of AF areas with respect to one subject to be automatically focused. Accordingly, when the contrast of a subject to be automatically focused varies from region to region, an AF area may be set in a low-contrast region, which generates a problem of deterioration in AF precision. Further, even by applying the technique disclosed in Jpn. Pat. Appln. KOKAI Publication No. 2006-184742, it is impossible to prevent an AF area from being set in a low-contrast portion.

When a large AF area is set so as to include the overall subject, the contrast gradient in the AF process may be reduced, which generates a problem of deterioration in precision of detecting a peak contrast.

BRIEF SUMMARY OF THE INVENTION

According to an embodiment of the present invention, an image capturing device comprises an image capturing unit configured to capture an image; a detection unit configured to detect a shape of an image area of an observed subject to be focused in the image captured by the image capturing unit; an area setting unit configured to set one or more contrast evaluation areas according to the shape of the image area detected by the detection unit; and a focusing unit configured to cause the image capturing unit to focus based on image data in the contrast evaluation areas set by the area setting unit.

According to another embodiment of the present invention, an image capturing method for an image capturing unit, the method comprises detecting a shape of an image area of an observed subject to be focused in the image captured by the image capturing unit; setting one or more contrast evaluation areas according to the detected shape of the image area; and causing the image capturing unit to focus based on image data in the set contrast evaluation areas.

According to another embodiment of the present invention, a non-transitory computer readable medium storing a computer program for controlling an image capturing unit, the program comprises detecting a shape of an image area of an observed subject to be focused in the image captured by the image capturing unit; setting one or more contrast evaluation areas according to the detected shape of the image area; and causing the image capturing unit to focus based on image data in the set contrast evaluation areas.

BRIEF DESCRIPTION OF THE SEVERAL VIEWS OF THE DRAWINGS

The accompanying drawings, which are incorporated in and constitute a part of the specification, illustrate embodiments of the present invention and, together with the general description given above and the detailed description of the embodiments given below, serve to explain the principles of the present invention.

DETAILED DESCRIPTION OF THE INVENTION

Figure 1:
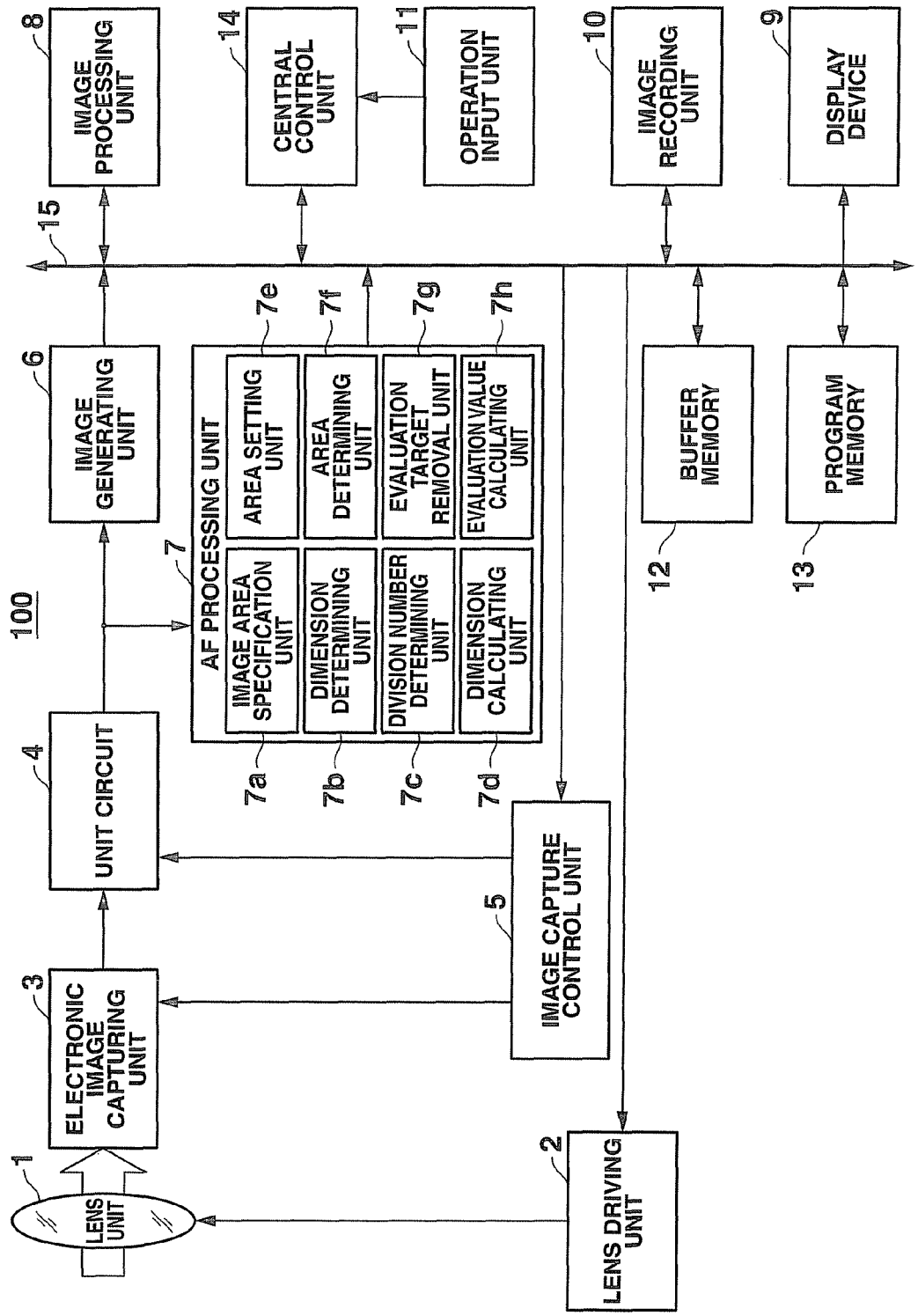
FIG. 1 is a block diagram schematically illustrating an image capturing device according to an embodiment of the present invention.

Hereinafter, a detailed embodiment of the present invention will be described, with reference to the accompanying drawings. It is to be noted that the scope of the invention is not limited to the examples illustrated in the drawings FIG. 1 is a block diagram schematically illustrating an image capturing device 100 according to an embodiment of the present invention.

The image capturing device 100 of the present embodiment detects the shape of an image area (Image Area A2, for example; see FIG. 6B) of an observed subject (observed subject S2, for example), which is to be focused, in a picked-up image (picked-up image G2, for example; see FIG. 6A), and sets a plurality of AF evaluation areas (AF evaluation areas P2, for example; see FIG. 6C) according to the shape of the image area of the observed subject, and causes a lens module 1 to focus.

For example, as shown in FIG. 1, the image capturing device 100 comprises the lens module 1, a lens driving unit 2, an electronic image capturing unit 3, a unit circuit 4, an image capture control unit 5, an image generating unit 6, an AF processing unit 7, an image processing unit 8, a display device 9, an image recording unit 10, an operation input unit 11, a buffer memory 12, a program memory 13, and a central control unit 14.

The lens unit 1 comprises a plurality of lenses, for example, a focus lens (not shown), a zoom lens (not shown), and the like.

The lens driving unit 2 drives each of the focus lens and the zoom lens included in the lens unit 1 in the optical axis direction. For example, the lens driving unit 2 comprises a driving source (not shown), such as a focus motor or a zoom motor, and a driver (not shown), for example, configured to drive the driving source according to a control signal from the central control unit 14.

The electronic image capturing unit 3 is arranged on the optical axis of the lens unit 1. Further, the electronic image capturing unit 3 comprises an image sensor, such as a charge coupled device (CCD) and a complementary metal-oxide-semiconductor (CMOS), and is configured to convert an optical image that has passed through the lenses of the lens unit 1 to a two-dimensional image signal.

The unit circuit 4 comprises a correlation double sampling (CDS) circuit configured to receive an analogue image signal input according to an optical image of a subject output from the electronic image capturing unit 3 and holds the input image signal, au automatic gain controller (AGC) configured to amplify the image signal, and an A/D converter (ADC) configured to convert the amplified image signal to a digital image signal.

The unit circuit 4 transmits the digital image signal to the image generating unit 6 and the AF processing unit 7.

The image capture control unit 5 controls the electronic image capturing unit 3 and the unit circuit 4 such that the electronic image capturing unit 3 and the unit circuit 4 are driven at timing in accordance with a frame rate set by the central control unit 14. For example, the image capture control unit 5 comprises a timing generator (TG; not shown), and a driver (not shown) configured to drive the electronic image capturing unit 3, and controls operation timing of the driver and the unit circuit 4. That is, when the central control unit 14 sets the shutter speed according to a program diagram read from the program memory 13, the TG of the image capture control unit 5 outputs the charge storage time corresponding to the shutter speed to the driver as a shutter pulse, and controls the charge storage time (exposure time) by operating the electronic image capturing unit 3 according to a driving pulse signal from the driver.

With the above-described configurations, the lens unit 1, the electronic image capturing unit 3, the unit circuit 4, and the image capture control unit 5 correspond to an image capturing unit configured to pick up an image of a subject.

The image generating unit 6 subjects the image data transmitted from the unit circuit 4 to gamma-correction and white balancing processes, and generates a brightness and color-difference signal (YUV data). Further, the image generating unit 6 outputs the image data of the generated brightness and color-difference signal to the central control unit 14 via the bus line 15.

Figure 5B:
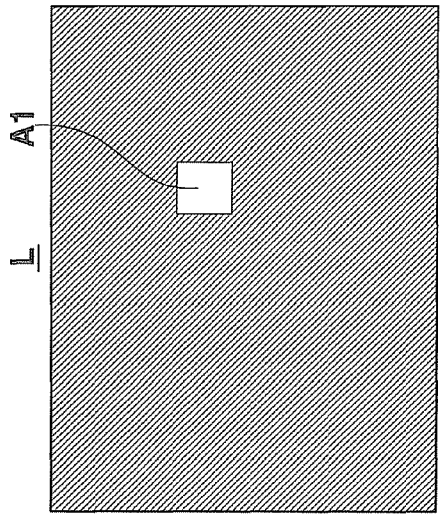
FIGS. 5A, 5B, 5C, and 5D schematically illustrate exemplary images of the automatic focusing process of FIG. 2.
Figure 5D:
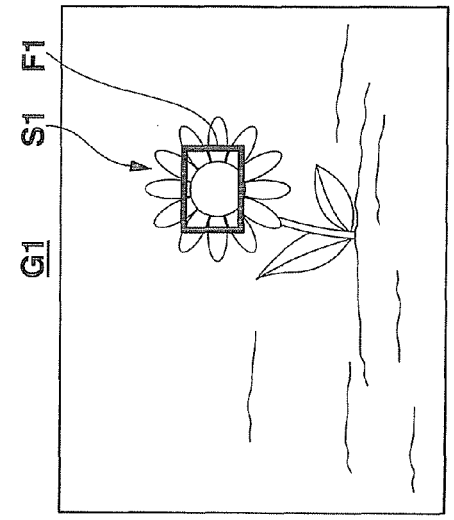
Figure 5A:
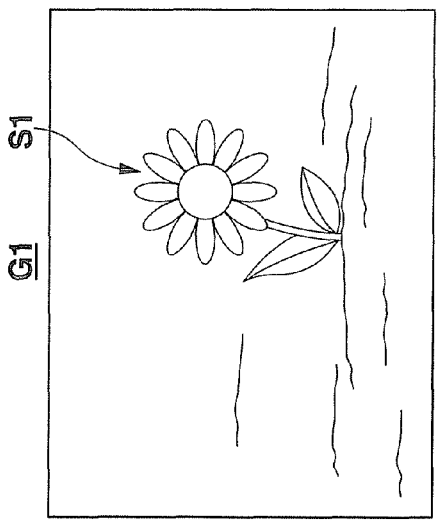
Figure 6A:
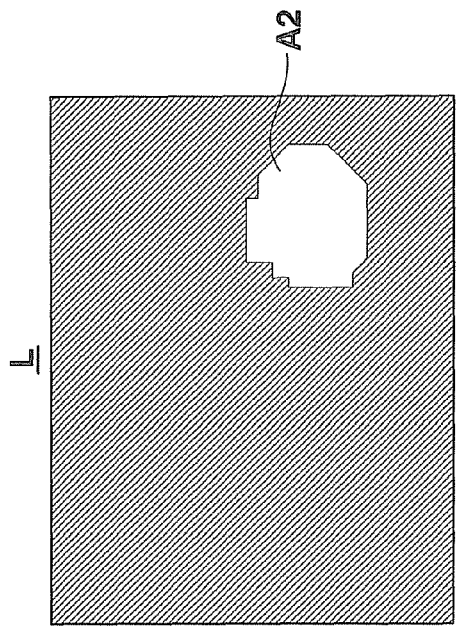
FIGS. 6A, 6B, 6C, and 6D schematically illustrate exemplary images of the automatic focusing process of FIG. 2.
Figure 6B:
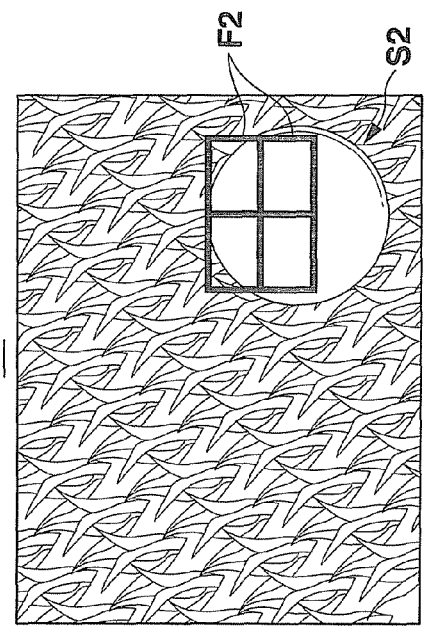
Figure 7A:
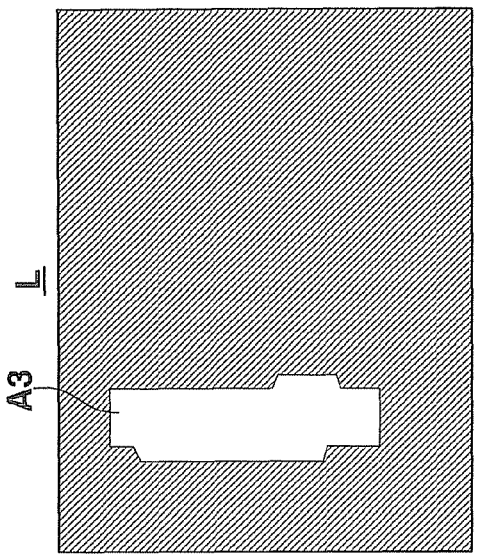
FIGS. 7A, 7B, 7C, and 7D schematically illustrate exemplary images in the automatic focusing process of FIG. 2.

The AF processing unit 7 comprises an image area detection unit 7a configured to detect an image area (image area A1, A2, or A3, for example; see FIG. 5B, 6B, or 7B) of an observed subject (observed subject S1, S2, or S3, for example; see FIG. 5A, 6A, or 7A) in a picked-up image (picked-up image G1, G2, or G3, for example; see FIG. 5A, 6A, or 7A).

Figure 4:
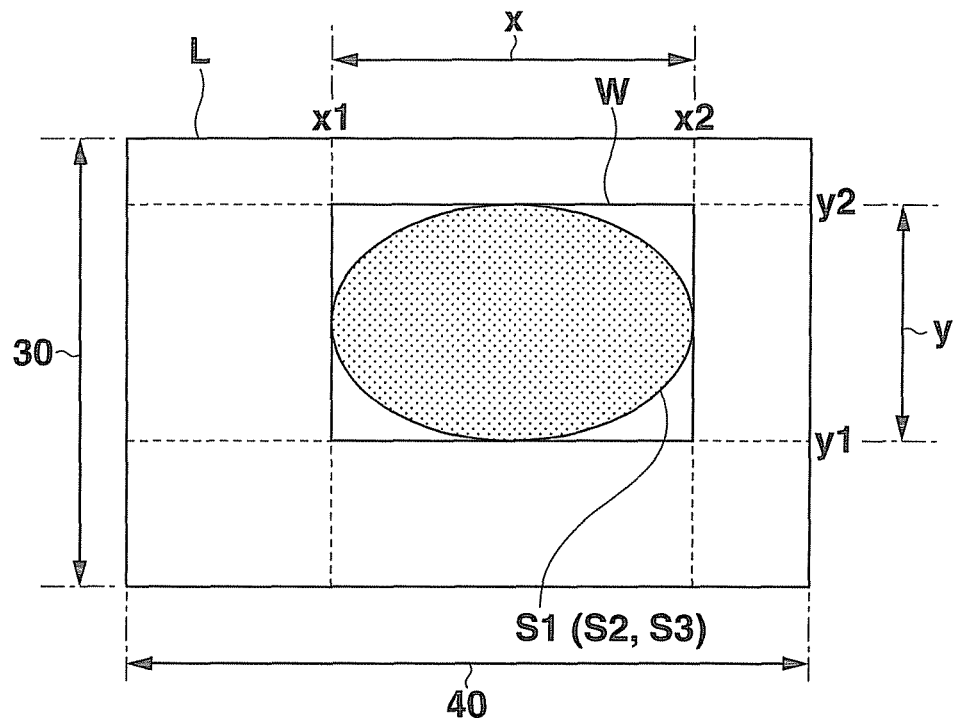
FIG. 4 schematically illustrates an example of an observed subject extracted by the automatic focusing process of FIG. 2.

Whenever the image area detection unit 7a receives image data from the unit circuit 4, for example, the image area detection unit 7a performs a reduction process on the image data to a predetermined rate both in the horizontal (lateral) direction and the vertical (longitudinal) direction, and sequentially generates low-resolution image data L (width by length: 40×30 pixels, for example; see FIG. 4). Further, the image area detection unit 7a detects an observed subject S1, S2, or S3 to be focused by applying a predetermined image recognition technique to the low-resolution image data L and extracts an image area. It is to be noted that the detection process of the observed subject may be performed by extracting an outline of the observed subject from continuity in change of color and brightness, for example, or by detecting the type of the observed subject in advance, comparing it with the characteristic information of the observed subject, and extracting an outline.

Figure 7B:
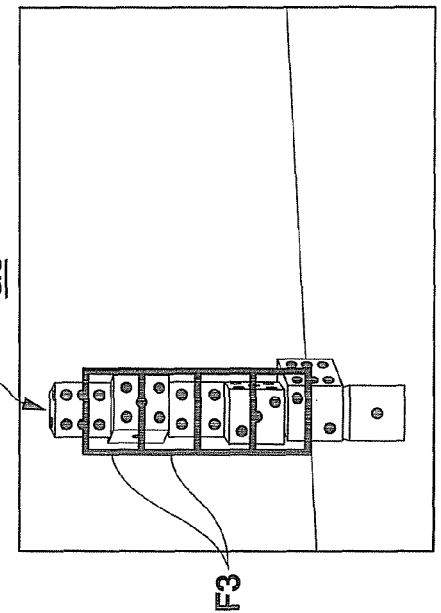

It is to be noted that, in FIG. 5B, 6B, or 7B, the image data is represented as being binarized, and the image area A1, A2, or A3 represented in white correspond to the observed subject S1, S2, or S3, and the image areas represented by the dotted black correspond to the portion other than the observed subject S1, S2, or S3.

An observed subject does not necessarily need to independently exist as one subject, and may be in a state in which a plurality of subjects are overlapped with one another in the distance direction, or in a state in which a plurality of subjects are separated from one another either in the horizontal or longitudinal direction.

The image area detection unit 7a detects the dimension of the image area A1, A2, or A3 of the extracted observed subject, and then sets the minimum rectangular frame W surrounding the image area A1, A2, or A3 of the observed subject as an assumed shape of the image area of the observed subject. For example, the image area detection unit 7a calculates a horizontal width x from the difference between the maximum coordinate x2 and the minimum coordinate x1 in the x-axis direction (horizontal direction) of an image area of an observed object, and calculates a vertical length y from the difference between the maximum coordinate y2 and the minimum coordinate y1 (see FIG. 4) in the y-axis direction (vertical direction), and thereby sets a rectangular frame (assumed contrast evaluation area) W with the horizontal width x and the vertical length y as an assumed shape of the image area of the observed subject.

The image area detection unit 7a corresponds to a subject setting unit configured to set the minimum rectangular shape W surrounding the image area of the observed subject to be focused in a picked-up image picked up by an image capturing unit including the lens unit 1, the electronic image capturing unit 3, the unit circuit 4, and the image control unit 5. Further, the image area detection unit 7a corresponds to a detection unit configured to detect the shape of an image area of the observed subject.

Figure 5C:
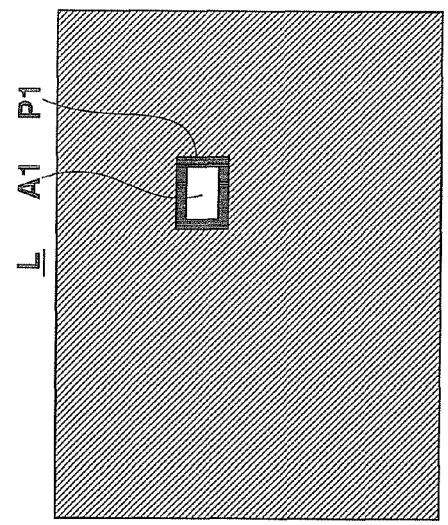
Figure 6C:
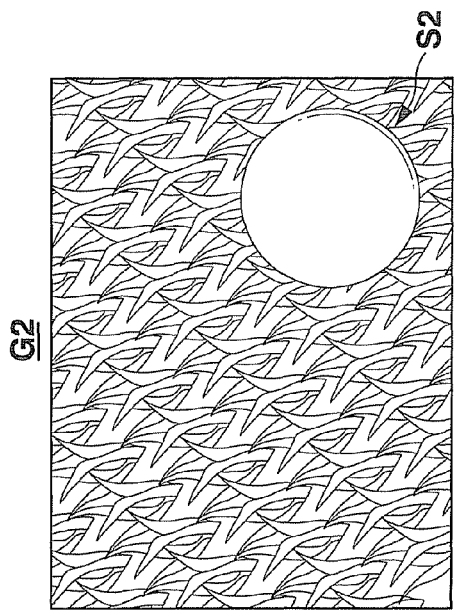
Figure 6D:
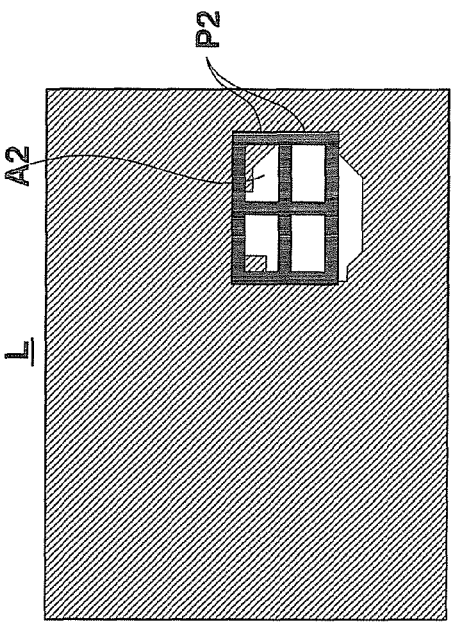
Figure 7C:
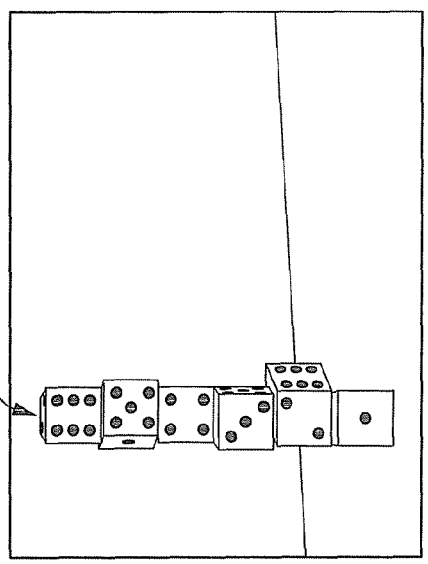
Figure 7D:
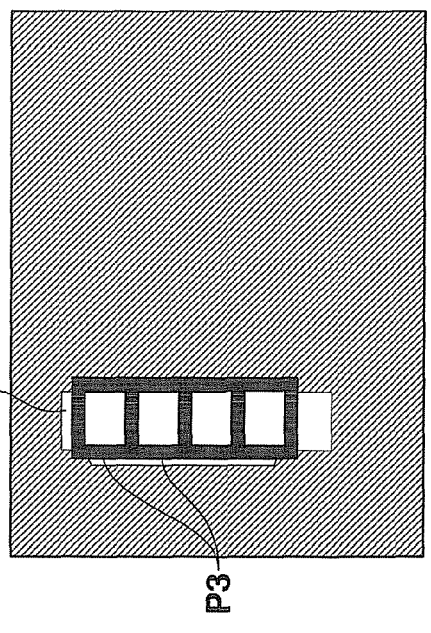

The AF processing unit 7 comprises a dimension determining unit 7b configured to determine whether the dimension of an image area (such as the image area A1, A2, or A3) of an observed subject (such as the observed subject S1, S2, or S3) is greater than the minimum dimension that can be set as an AF evaluation area (such as AF evaluation area P1, P2, or P3; see FIG. 5C, 6C, or 7C).

For example, the dimension determining unit 7b determines whether the dimension of the rectangular frame W set by the image area detection unit 7a is greater than the minimum dimension of each of the AF evaluation areas set in advance. The minimum dimension of the evaluation area is set such that the minimum horizontal width $X_{min}$ is 6 pixels and the minimum vertical length $Y_{min}$ is 4 pixels, with respect to the image data L of a low resolution (width by length: 40×30 pixels, for example). Further, as a result of determination by the dimension determining unit 7b, the area setting unit 7e (which will be described later) sets a plurality of AF evaluation areas when the dimension of the rectangular frame W is greater than the minimum dimension of each of the evaluation areas. The area setting unit 7e sets one AF evaluation area with the minimum dimension when the dimension of the rectangular frame W is equal to or smaller than the minimum dimension of each of the AF evaluation areas.

The dimension determining unit 7b corresponds to a dimension determining unit configured to determine whether the dimension of an image area of an observed subject is greater than the minimum dimension of the AF evaluation area (contrast evaluation area) that can be set.

The AF processing unit 7 comprises a division number determining unit 7c configured to determine the number of divisions of the rectangular frame W according to the dimension of the rectangular frame (assumed contrast evaluation area) W set by the image area detection unit 7a.

The division number determining unit 7c calculates the division number of the rectangular frame W, that is, a plurality of set numbers of the AF evaluation areas P1, P2, or P3 set by the area setting unit, according to the ratio (length-to-width ratio "Ratio"). For example, the division number determining unit 7c calculates the length-to-width ratio "Ratio" of the rectangular frame W from the vertical length y and the horizontal width x according to the following formula (1):

$$\text{Ratio}=(x/y)\times 100 \qquad (1)$$

Next, the division number determining unit 7c determines the overall shape (such as "1×n type", "2×n type", "n×n type", "n×1 type", and "n×2 type; n is a natural number" of the AF evaluation area according to the calculated length-to-width ratio "Ratio", and then calculates division numbers Nx and Ny of the rectangular frame W from a predetermined calculation formula defined by the dimension of the rectangular frame W and the minimum dimension of each of the AF evaluation areas, according to the overall shape of the AF evaluation area.

For example, when the length-to-width ratio "Ratio" is smaller than 44, the division number determining unit 7c determines the overall shape of the AF evaluation area as "1×n type", and then calculates the division number Ny in the vertical direction of the rectangular frame W by dividing the vertical length y of the rectangular frame W by the minimum dimension $Y_{min}$ in the vertical direction of the AF evaluation area. Since the overall shape of the AF evaluation area is "1×n type", the division number Nx in the horizontal direction of the rectangular frame W is "1".

For example, when the length-to-width ratio "Ratio" is equal to or greater than 44 and less than 66, the division number determining unit 7c determines the overall shape of the AF evaluation area as "2×n type", and then calculates the division number Ny in the vertical direction of the rectangular shape W by dividing the vertical length y of the rectangular frame W by the minimum dimension $Y_{min}$ in the vertical direction of the AF evaluation area. Since the overall shape of the AF evaluation area is "2×n type", the division number Nx of the horizontal direction of the rectangular frame W is "2".

For example, when the length-to-width ratio "Ratio" is equal to or greater than 66 and less than 266, the division number determining unit 7c determines the overall shape of the AF evaluation area as "n×n type", and calculates the division number Ny of the vertical direction of the rectangular frame W by dividing the vertical length y of the rectangular frame W by the minimum dimension $Y_{min}$ of the vertical direction of the AF evaluation area. Since the overall shape of the AF evaluation area is "n×n type", the division number Nx of the horizontal direction of the rectangular frame W becomes a value equal to the division number Ny of the vertical direction.

For example, when the length-to-width ratio "Ratio" is equal to or greater than 266 and less than 400, the division number determining unit 7c determines the overall shape of the AF evaluation area as "n×2 type", and then calculates the division number Nx of the horizontal direction of the rectangular frame W by dividing the horizontal width x of the rectangular frame W by the minimum dimension $X_{min}$ of the horizontal direction of the AF evaluation area. Since the overall shape of the AF evaluation area is "n×2 type", the division number Ny of the vertical direction of the rectangular frame W is "2".

For example, when the length-to-width ratio "Ratio" is equal to or greater than 400, the division number determining unit 7c determines the overall shape of the AF evaluation area as "n×1 type", and then calculates the division number Nx of the horizontal direction of the rectangular frame W by dividing the horizontal width x of the rectangular frame W by the minimum dimension $X_{min}$ of the horizontal direction of the AF evaluation area. It is to be noted that, since the overall shape of the AF evaluation area is "n×1 type", the division number Ny of the vertical direction of the rectangular frame W is "1".

The division number determining unit 7c corresponds to a determining unit configured to determine the set number in the vertical and horizontal directions of a plurality of AF evaluation areas set adjacent to one another according to the ratio of length in the vertical and horizontal directions in an image area of the observed object.

It is to be noted that the length-to-width ratio "Ratio", the overall shape of the AF evaluation area (AF frame), and the division numbers Nx and Ny, have been described above as just examples and may be arbitrarily changed as appropriate.

The AF processing unit 7 comprises a dimension calculating unit 7d configured to calculate the dimension of each of the rectangular AF evaluation areas (such as AF evaluation areas P1, 22, P3).

The dimension calculating unit 7d calculates the vertical length Y of the AF evaluation area by dividing the vertical length y of the rectangular frame W by the division number Ny of the vertical direction of the rectangular frame W determined by the division number determining unit 7c, and calculates the horizontal width X of the AF evaluation area according to the shape (width by length: 4×3 ratio, for example) of the AF evaluation area defined in advance.

The dimension calculating unit 7d corresponds to a calculating unit configured to calculate the dimension of the AF evaluation area according to the shape and dimension (shape and dimension of the rectangular frame W) of an image area of an observed subject, and the set numbers (division numbers of the rectangular frame W) in the vertical and horizontal directions of the AF evaluation area determined by the division number determining unit 7c.

The AF processing unit 7 comprises an area setting unit 7e configured to set a plurality of AF evaluation areas (such as the AF evaluation areas P1, P2, or P3) of the dimension calculated by the dimension calculating unit 7d, according to the shape of an image area (such as the image area A1, A2, or A3) of an observed subject (such as the observed subject S1, S2, or S3).

Whenever the dimension calculating unit 7d sets the dimension of an AF evaluation area, the area setting unit 7e sequentially sets a plurality of AF evaluation areas according to the shape of an image area of an observed subject. For example, when the dimension of the rectangular frame W is larger than the minimum dimension that can be set by the dimension determining unit 7b as a predetermined AF evaluation area, the area setting unit 7e arranges the rectangular AF evaluation areas adjacent to one another, such that the intermediate point of the horizontal width x of the rectangular frame W and the intermediate point of the horizontal width X of the AF evaluation area (AF frame) approximately overlap with each other. That is, the area setting unit 7e sets the AF evaluation area by giving priority to the vertical direction over the horizontal direction of the image area of the observed subject. Thereby, the area setting unit 7e sets a rectangular frame expanded as a whole including a plurality of AF evaluation areas.

It is to be noted that FIGS. 5C, 6C, and 7C illustrate the states in which the AF evaluation areas P1, P2, or P3 are set with respect to the binarized image data.

The area setting unit 7e corresponds to an area setting unit configured to set a plurality of AF evaluation areas according to the shape of an image area of the observed subject.

The area setting unit 7e sets only one AF evaluation area P1 when the dimension of the rectangular frame W has been determined by the dimension determining unit 7b as being equal to or smaller than the minimum dimension of the AF evaluation area P1 (FIGS. 5A-5C).

The AF processing unit 7 comprises an area determining unit 7f configured to determine whether an AF evaluation area (such as the AF evaluation area P1, P2, or P3) set by the area setting unit 7e includes an image area (such as the image area A1, A2, or A3) of an observed subject (such as the observed subject S1, S2, or S3) at a ratio equal to or greater than a predetermined ratio.

The area determining unit 7f detects an image area (observed subject area) of the observed subject from each of the AF evaluation areas, with respect to a plurality of AF evaluation areas set by the area setting unit 7e according to the rectangular frame W as an assumed shape of the image area of the observed subject as an area determining unit, and then determines whether the observed subject area is included at a ratio equal to or greater than a predetermined ratio (50 percent, for example).

The AF processing unit 7 comprises an evaluation target removal unit 7g configured to remove an AF evaluation area that does not include an image area (such as the image area A1, A2, or A3) of the observed subject (such as the observed subject S1, S2, or S3) at a ratio equal to or greater than a predetermined ratio, according to the determining result of the area determining unit 7f.

The value target removal unit 7g removes an AF evaluation area determined by the area determining unit 7f as not including the observed subject area at a ratio equal to or greater than a predetermined ratio from the evaluation target as an invalid AF frame. Thereby, only AF evaluation area determined by the area determining unit 7f as including an observed subject area at a ratio equal to or greater than a predetermined ratio is set as a valid AF frame.

The AF processing unit 7 comprises an evaluation value calculating unit 7h configured to calculate an AF evaluation value used in determining the focusing state.

The evaluation value calculating unit 7h calculates an AF evaluation value of image data transmitted to the AF processing unit 7 from the unit circuit 4. For example, the evaluation value calculating unit 7h calculates an AF evaluation value (contrast evaluation value) indicating the degree of contrast of an image based on image data of an AF evaluation area (such as the AF evaluation area P1, P2, or P3), set as a valid AF frame by the area determining unit 7f, included in the low-resolution image data L (width by length: 40×30 pixels, for example; see FIG. 4) generated by the image area detection unit 7a.

The image processing unit 8 comprises an encoder (not shown) configured to compress and code image data (YUV data) generated by the image generating unit 6 by a predetermined coding scheme (JPEG, for example), and a decoder (not shown) configured to decode the coded image data read by the image recording unit 10 by a decoding scheme compliant with the coding scheme.

The display device 9 converts a frame of YUV data stored in the buffer memory 12 into a video signal, and then displays it as a live view image on the display screen. For example, the display device 9 displays a live view image based on a plurality of image frames generated by picking up an image of a subject, and displays a REC view image picked up as a main picked-up image.

When an image is played back, the display device 9 displays an image based on image data read by the image recording unit 10 and decoded by the image processing unit 8.

The image recording unit 10 comprises a nonvolatile memory (flash memory), for example, and the like. Further, the image recording unit 10 stores still image data and moving image data compressed and coded by the encoder (not shown) of the image processing unit 8 by a predetermined coding scheme (such as JPEG and MPEG).

The operation input unit 11 is designed to perform a predetermined operation on the image capturing device 100. For example, the operation input unit 11 comprises a shutter button (not shown) relating to photography instruction of the subject, a selection determination button (not shown) relating to selection instruction of an image capturing mode, functions, and the like, a zoom button (not shown) relating to adjustment instruction of the amount of zoom, and the like, and the operation input unit 11 outputs a predetermined operation signal to the central control unit 14 according to an operation of these buttons.

The buffer memory 12 is a buffer configured to temporarily store image data, for example, and is also used as a working memory, for example, of the central control unit 14.

The program memory 13 stores various kinds of programs and data relating to functions of the image capturing device 100. Further, the program memory 13 stores program AE data, which forms a program diagram indicating the combination of an aperture value (F) and a shutter speed corresponding to an appropriate exposure value (EV) in each type of shooting, such as still image shooting, continuous shooting, and live view image shooting, and an EV value chart, as well.

The central control unit 14 is a one-chip microcomputer configured to control the units of the image capturing device 100.

The central control unit 14 controls each unit of the image capturing device 100 based on an operation signal output from and input by the operation input unit 11. For example, when an image capturing device 100 output according to a predetermined operation of the shutter button of the operation input unit 11 is input, the central control unit 14 executes a process of shooting a still image by causing the TG to control the driving timing of the electronic image capturing unit 3 and the unit circuit 4 according to a predetermined program stored in the program memory 13. As a result of shooting of the still image, the one frame of YUV data stored in the buffer memory 12 is compressed and encoded by JPEG, for example, by the image processing unit 8, and stored as still image data in the image recording unit 10.

The central control unit 14 causes the lens unit 1 to focus by outputting a predetermined control signal to the lens driving unit 2 and driving the focus motor, based on the AF evaluation value calculated by the evaluation value calculating unit 7h of the AF processing unit 7 based on the image data of an AF evaluation area (AF evaluation area P1, P2, or P3, for example), which is a valid AF frame. In this case, the central control unit 14 may cause the image capturing device to focus by adopting an output result of the AF evaluation area 3, which is included in the AF evaluation areas set by the area setting unit 7e of the AF processing unit 7, in which detection precision of a contrast gradient of the image data in each evaluation area calculated by the evaluation value calculating unit 7h is a value equal to or greater than a predetermined value, and which includes a peak contrast in a distance closest to the image capturing device 100. That is, even if a plurality of AF evaluation areas are set in a plurality of observed subjects, the focus may be adjusted in one observed subject by giving priority to closer ones.

The central control unit 14 and the lens driving unit 2 correspond to a focusing control unit configured to cause an image capturing device to focus based on image data in an AF evaluation area set by the area setting unit 7e.

Next, an automatic focusing process according to a focusing method of the image capturing device 100 will be described, with reference to FIGS. 2-7D.

Figure 2:
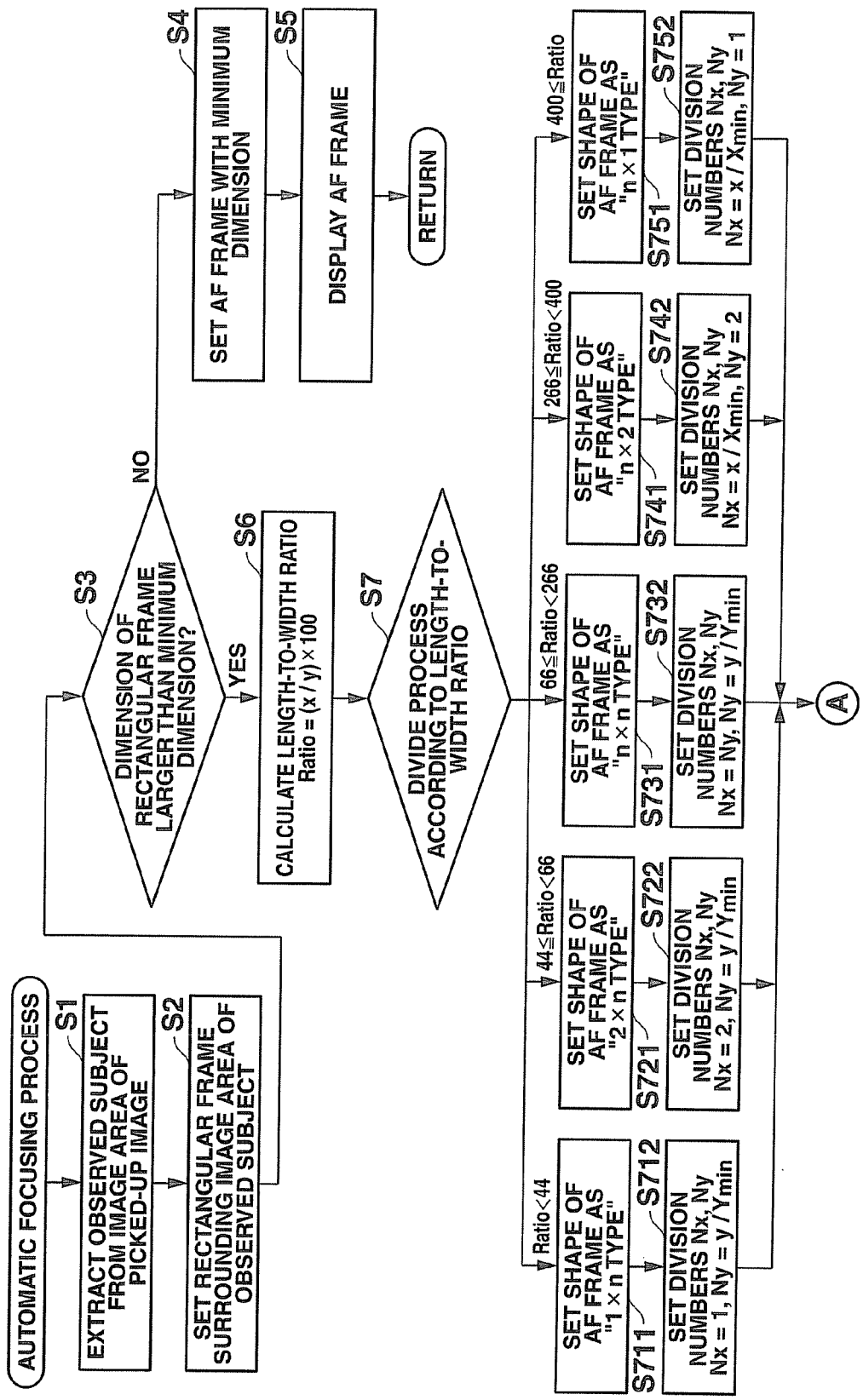
FIG. 2 is a flowchart illustrating an example of an operation of an automatic focusing process of the image capturing device according to the embodiment.
Figure 3:
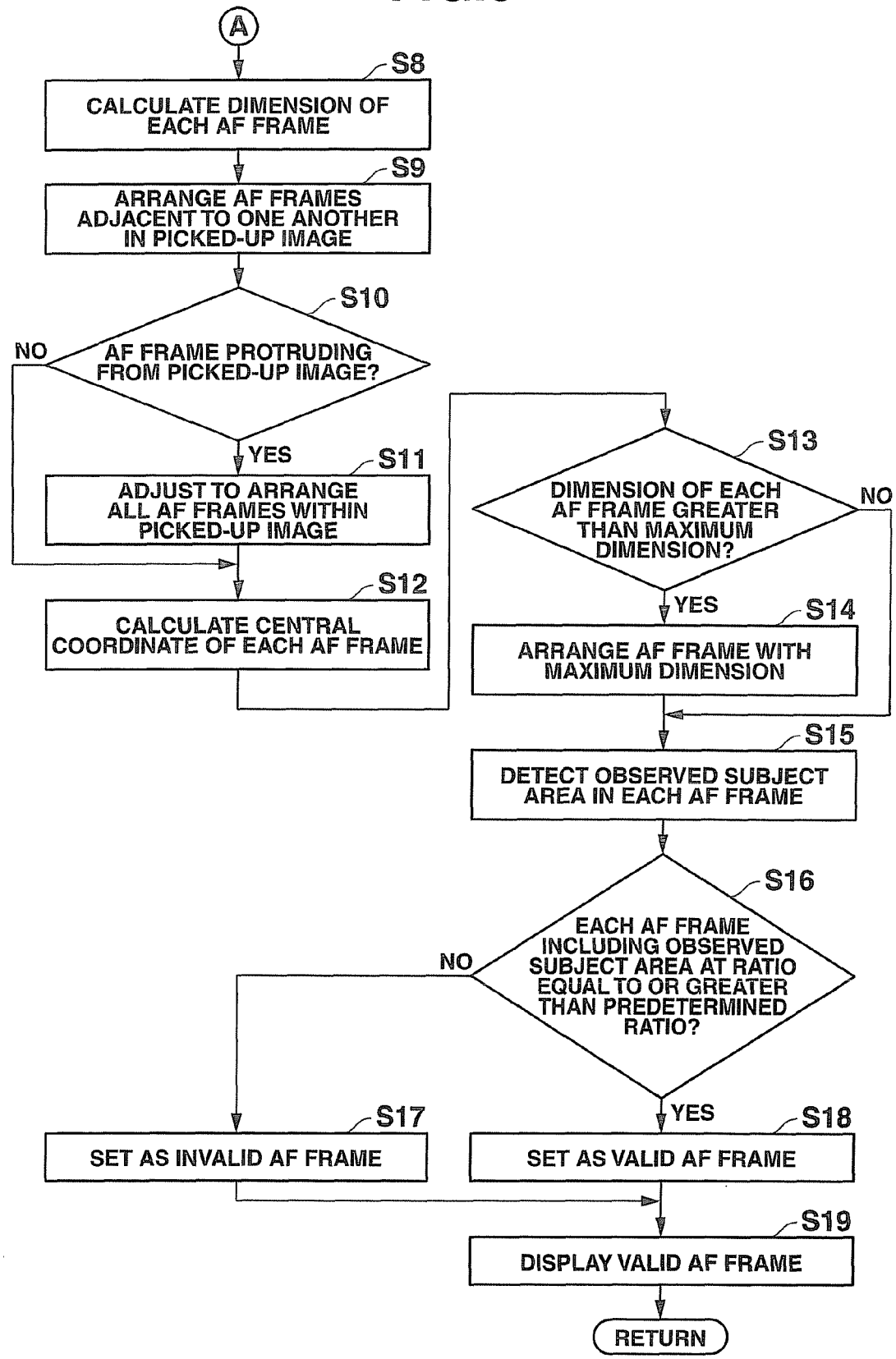
FIG. 3 is a flowchart illustrating continuation of the automatic focusing process of FIG. 2.

FIGS. 2 and 3 are flowcharts illustrating an exemplary operation of an automatic focusing process. Further, FIG. 4 schematically shows an example of an observed subject extracted by the automatic focusing process.

The automatic focusing process is a process that is repeatedly executed under the control of the central control unit 14, when the user performs a predetermined operation (half-pressing operation, for example) on a shutter button of the input unit 11 while a live view image is being displayed. It is to be noted that the automatic focusing process may be executed regardless of whether the shutter button is operated or not.

As shown in FIG. 2, whenever image data of a plurality of image frames (see FIGS. 5A, 6A, 7A, and the like) of a picked-up image (picked-up image G1 or G2, for example) generated by picking up an image of a subject is transmitted from the unit circuit 4 to the AF processing unit 7, the AF processing unit 7 performs a process of extracting an image area (such as the image area A1, A2, or A3) of an observed subject (such as the observed subject S1, S2, or S3) from the image data (step S1).

For example, the image area detection unit 7a of the AF processing unit 7 generates low-resolution image data L (width by length: 40×30 pixels, for example; see FIG. 4) by performing a reduction process to the image data transmitted from the unit circuit 4 by a predetermined Ratio, and then extracts the image area A1, A2, or A3 by detecting the observed subject S1, S2, or S3 (see FIG. 5B, 6B, or 7B, and the like) to be focused, and applying an image recognition technology to the low-resolution image data L.

The image area detection unit 7a sets the minimum rectangular frame W surrounding the image area A1, A2, or A3 of the observed subject extracted as shown in FIG. 4 as an assumed shape of the image area of the observed subject (step S2).

For example, an image area detection unit 7a calculates a horizontal width x in the x-axis direction (horizontal direction) of the image area A1, A2, or A3 of the observed subject S1, S2, or S3 and a vertical length y in the y-axis direction (vertical direction) (see FIG. 4), and sets the rectangular frame W of the horizontal width x and the vertical length y.

The dimension determining unit 7b of the AF processing unit 7 determines whether dimension of the rectangular frame W set by the image area detection unit 7a is greater than the minimum dimension that can be set as an AF evaluation area (such as the AF evaluation area P1, P2, or P3) set in advance (step S3).

When the dimension of the rectangular frame W is determined as not being greater than the minimum dimension of the AF evaluation area (step S3; NO), the area setting unit 7e of the AF processing unit 7 sets an AF evaluation area P1 (see FIG. 5C) with the minimum dimension such that the central coordinate of the AF evaluation area (AF frame) with the minimum dimension overlaps with the central coordinate of the rectangular frame W (step S4).

The central control unit 14 displays an AF frame display F1 corresponding to the edge portion of the AF evaluation area P1 set by the area setting unit 7e on the display device 9 such that the AF frame display F1 overlaps with the observed subject S1 of the live view image (step S5). Further, the AF processing unit 7 adjusts the focus position of the lens unit 1 by driving the focus motor by outputting a predetermined control signal to the lens driving unit 2 using an AF evaluation value calculated based on the image data of the AF evaluation area P1 by the evaluation value calculating unit 7h.

When the dimension of the rectangular frame W has been determined in step S3 as being greater than the minimum dimension of the AF evaluation area (step S3; YES), the division number determining unit 7c of the AF processing unit 7 calculates a ratio (length-to-width ratio "Ratio") of the vertical length y and the horizontal width x of the rectangular frame W from the vertical length y and the horizontal width x, according to the following formula (1) (step S6):

$$\text{Ratio} = (x/y) \times 100 \quad (1)$$

The AF processing unit 7 divides the process according to the length-to-width ratio "Ratio" of the rectangular frame W (step S7).

For example, when the length-to-width ratio "Ratio" is smaller than 44, the division number determining unit 7c determines the overall shape of the AF evaluation area as "1×n type" (step S711). Following that, the division number determining unit 7c calculates the division number Ny of the vertical direction of the rectangular frame W by dividing the vertical length y of the rectangular frame W by the minimum dimension $Y_{min}$ of the vertical direction of the AF evaluation area and sets the division number Nx in the horizontal direction of the rectangular frame W as "1" (step S712).

When the length-to-width ratio "Ratio" is equal to or greater than 44 and less than 66, the division number determining unit 7c determines the overall shape of the AF evaluation area as "2×n type" (step S721). Following that, the division number determining unit 7c calculates the division number Ny of the vertical direction of the rectangular frame W by dividing the vertical length y of the rectangular frame W by the minimum dimension $Y_{min}$ of the vertical direction of the AF evaluation area and sets the division number Nx of the horizontal direction of the rectangular frame W as "2" (step S722).

When the length-to-width ratio "Ratio" is equal to or greater than 66 and less than 266, the division number determining unit 7c determines the overall shape of the AF evaluation area as "n×n type" (step S731). Following that, the division number determining unit 7c calculates the division number Ny of the vertical direction of the rectangular frame W by dividing the vertical length y of the rectangular frame W by the minimum dimension $Y_{min}$ of the vertical direction of the AF evaluation area and sets the division number Nx of the horizontal direction of the rectangular frame W as a value equal to the division number Ny (step S732).

When the length-to-width ratio "Ratio" is equal to or greater than 266 and less than 400, the division number determining unit 7c determines the overall shape of the AF evaluation area as "n×2 type" (step S741). Following that, the division number determining unit 7c calculates the division number Nx of the horizontal direction of the rectangular frame W by dividing the horizontal width x of the rectangular frame W by the minimum dimension $X_{min}$ of the horizontal direction of the AF evaluation area and sets the division number Ny of the vertical direction of the rectangular frame W as "2" (step S742).

When the length-to-width ratio "Ratio" is equal to or greater than 400, the division number determining unit 7c determines the overall shape of the AF evaluation area as "n×1 type" (step S751). Following that, the division number determining unit 7c calculates the division number Nx of the horizontal direction of the rectangular frame W by dividing the horizontal width x of the rectangular frame W by the minimum dimension $X_{min}$ of the horizontal direction of the AF evaluation area and sets the division number Ny of the vertical direction of the rectangular frame W as "1" (step S752).

The dimension calculating unit 7d of the AF processing unit 7 calculates the vertical length Y of an AF evaluation area (such as the AF evaluation area P2 or P3) by dividing the vertical length y of the rectangular frame W by the division number Ny of the vertical direction of the rectangular frame W determined by the division number determining unit 7c, and then calculates the horizontal width X of the AF evaluation area according to the shape (width to length: 4:3 ratio, for example) of a predetermined AF evaluation area (step S8).

The area setting unit 7e of the AF processing unit 7e arranges a plurality of AF evaluation areas (such as the AF evaluation areas P2 or P3) with the dimension calculated by the dimension calculating unit 7b, such that the AF evaluation areas are adjacent to one another, according to the type determined in step S711, S721, S731, S741, or S751, according to the shape of an image area (such as the image area A2 or A3) of an observed subject (such as the observed subject S2 or S3) with respect to a low-resolution picked-up image L (step S9; see FIG. 6C or 7C).

The area setting unit 7e determines whether each of a plurality of AF evaluation areas (such as the AF evaluation areas P2 or P3) protrudes from an edge portion of the low-resolution picked-up image L (step S10).

When the AF evaluation area has been determined as protruding from the edge portion of the picked-up image (step S10; YES), the area setting unit 7e adjusts the arrangement of all the AF evaluation areas such that AF evaluation areas that protrude from the edge portion of the picked-up image do not exist (step S11). That is, when an observed subject (such as the observed subject S2 or S3) is close to an upper, lower, right, or left edge, the AF evaluation area may protrude from the edge portion of the picked-up image. In this case, in order to equally determine the AF evaluation value of each of the AF evaluation areas, all the AF evaluation areas should not protrude from the picked-up image. Accordingly, the area setting unit 7e shifts the AF evaluation areas such that all the AF evaluation areas are arranged in a picked-up image without changing the dimension or shape of the AF evaluation areas.

The area setting unit 7e calculates the central coordinate of all the AF evaluation areas (such as the AF evaluation areas P2 or P3) (step S12), and then determines whether the dimension of the AF evaluation areas are greater than the preset maximum dimension (for example, the maximum horizontal width $X_{max}$ is 8 pixels and the maximum vertical length $Y_{max}$ is 6 pixels, with respect to low-resolution image data L formed of 40 by 30 pixels) that can be set as the AF evaluation area (step S13). When the AF evaluation area has been determined as not protruding from an edge portion of the picked-up image (step S10; NO), the area setting unit 7e shifts the process to step S12 and performs the subsequent processes.

The area determining unit 7f of the AF processing unit 7 detects an image area (observed subject area) of an observed subject (such as the observed subject S2 or S3) from each of the AF evaluation areas, with respect to a plurality of AF evaluation areas set by the area setting unit 7e (step S15), and then determines whether the observed subject area is included at a ratio equal to or greater than a predetermined ratio (50 percent, for example) (step S16). Even when the AF evaluation area is determined as not being greater than the maximum dimension (step S13; NO), the area determining unit 7f shifts the process to step S15 and performs the subsequent processes.

When the observed subject area has been determined as not being included at a ratio equal to or greater than a predetermined ratio in step S16 (step S16; NO), the evaluation target removal unit 7g of the AF processing unit 7 sets the AF evaluation area that does not include the observed target area at a ratio equal to or greater than the predetermined ratio as an invalid AF frame, and removes it from an evaluation target (step S17). When the observed subject area has been determined as being included at a ratio equal to or greater than a predetermined ratio (step S16; YES), on the other hand, the evaluation target removal unit 7 of the AF processing unit 7 sets an AF evaluation area that includes the observed subject area at a ratio equal to or greater than the predetermined ratio as a valid AF frame (step S18).

The central control unit 14 displays an AF frame display F2 or F3 (see FIG. 6C or 7C) corresponding to edge portions of an AF evaluation area (such as the AF evaluation area P2 or P3) set as a valid AF frame, according to the shape of the observed subject (such as the observed subject S2 or S3) of a live view image (step S19), and causes the lens unit 1 to focus by outputting a predetermined control signal and driving the focus motor, based on the AF evaluation value calculated based on the image data of the AF evaluation area as a valid AF frame by the evaluation value calculating unit 7h of the AF processing unit 7.

Thus, according to the above-described automatic focusing process, when "flower", for example, is macro-photographed, the central portion of "petals" is extracted as an observed subject S1, and an AF evaluation area P1 (see FIG. 5C) with the minimum dimension is set, even when the dimension of the rectangular frame W surrounding the image area A1 of the observed subject S1 is not greater than the minimum dimension of the AF evaluation area, and an AF frame display F1 (see FIG. 5D) corresponding to the edge portion of the AF evaluation area P1 with the minimum dimension is displayed such that the AF frame display F1 overlaps with the observed subject S1 in a live view image, as shown in FIGS. 5A-5D, for example.

On the other hand, even when the subject does not have a contrast, as in a situation where "white ball", such as a ping-pong ball, is photographed outdoors on a sunny day as shown in FIGS. 6A-6D, the "white ball" is detected as an observed subject S2, the set number of the AF evaluation area P2 is set from the length-to-width ratio "Ratio" of the rectangular frame W surrounding the image area A2 of the observed subject S2, and then the dimension of each of the AF evaluation areas P2 can be calculated. Further, four 2×2-type AF evaluation areas P2 are set to be adjacent to one another according to the shape of the image area A2 of the observed subject S2 (see FIG. 6C), and four AF frame displays F2 (see FIG. 6D) corresponding to the edge portion of the AF evaluation areas P2 are displayed so as to overlap with the observed subject S2 in a live view image.

Further, as shown in FIGS. 7A-7D, for example, even in a composition in which a subject (such as a plurality of dices stacked on one another) is at an edge, the "plurality of dices" can be detected as an observed subject S3. As in the case of the above, four 1×4-type AF evaluation areas P3 are set adjacent to one another according to the shape of the image area A3 of the observed subject S3 (see FIG. 7C), and four AF frame displays F3 (see FIG. 7D) corresponding to the edge portion of the AF evaluation area 23 are displayed so as to overlap with the observed subject S3 in a live view image.

As described above, according to the image capturing device 100 of the present embodiment, the shape of an image area (such as the image area A1, A2, or A3) of an observed subject (such as the observed subject S1, S2, or S3) to be focused in a picked-up image (such as the picked-up image G1, G2, or G3) is detected, a plurality of AF evaluation areas (such as the AF evaluation areas P2 or P3) are set according to the shape of the image area of the observed subject, and the lens unit 1 is caused to focus based on the image data in the AF evaluation areas. That is, since the shape of an image area of an observed subject is sequentially detected in an automatic focusing process, and a plurality of AF evaluation areas are sequentially set according to the shape of the image area of the sequentially detected observed subject, even when an observed subject with a contrast that varies from portion to portion is an AF target, it is possible to prevent a state in which the AF area is set in a low-contrast portion. Further, since a large AF area including the observed subject is set, it is possible to prevent a contrast gradient in an image data in an AF evaluation area from being reduced.

Accordingly, precision of the automatic focusing process can be improved by a plurality of AF evaluation areas set according to the shape of the image area of the observed subject.

Further, when the dimension of an image area (such as the image area A1, A2, or A3) of an observed subject (such as the observed subjects S1, S2, or S3) are greater than the minimum dimension of an AF evaluation area (such as the AF evaluation area P1, P2, or P3), the rectangular AF evaluation areas P2 or P3 are set so as to be adjacent to one another, and when the dimension of the image area of the observed subject is equal to or lower than the minimum dimension of the AF evaluation area, an AF evaluation area P1 with the minimum dimension is set, and the AF evaluation area can be set appropriately no matter what dimension the image area of the observed subject has.

Moreover, since the dimension of an AF evaluation area can be calculated based on the shape and dimension of an image area (such as the image area A1, A2, or A3) of an observed subject (such as the observed subject S1, S2, or S3) and the set numbers of the vertical and horizontal directions of an AF evaluation area (such as the AF evaluation area P1, P2, or P3), the dimension of the AF evaluation area can be varied according to the shape of the image area of the observed subject, the dimension of the image area, and the set numbers of the vertical and horizontal directions of the AF evaluation area, a plurality of AF evaluation areas P2 or P3 can be set appropriately.

It is to be noted that calculation of the dimension of the AF evaluation area needs to be based only on the set numbers of the vertical and horizontal directions of the AF evaluation area, and does not necessarily need to be based on the shape and dimension of the image area of the observed subject.

Further, calculation of the dimension of the AF evaluation area needs to be based only on the set numbers of the vertical and horizontal directions of the AF evaluation area, and do not necessarily need to be based on the shape and dimension of the image area of the observed subject.

Moreover, the AF evaluation area is removed from the evaluation target when a plurality of AF evaluation areas (such as AF evaluation areas P1, P2, P3) set according to the rectangular shape W as an assumed shape of an image area (such as image areas A1, A2, A3) of an observed subject (such as observed subjects S1, S2, S3) do not include an image area of an observed subject at a Ratio equal to or greater than a predetermined ratio. Therefore, an AF evaluation area not corresponding to an image area of the observed subject can be set as an invalid AF frame and can be removed from the evaluation target.

The present invention is not limited to the above-described embodiments, and may be embodied with various improvements and design modifications within the scope of the invention.

For example, when an AF evaluation area is set by the area setting unit 7e, the AF evaluation area may be arranged such that it overlaps with the edge portions of the image area of the observed subject. That is, even when the observed subject itself does not have a high contrast, since a contrast difference exists in the boundary between the observed subject and the other part, a more appropriate AF evaluation value can be calculated by the evaluation value calculating unit 7h, and thereby the automatic focusing process can be performed more appropriately.

Further, detection of an image area of an observed subject is performed by generating low-resolution image data L from the image data transmitted from the unit circuit 4 in the above-described description, but the low-resolution image data L does not necessarily need to be generated, and the detection may be performed using the image data itself transmitted from the unit circuit 4.

Further, the shape and dimension of an image area of an observed subject are detected in the above-described description, but the present embodiment is not limited thereto and whether to detect the dimension can be arbitrarily changed as appropriate, and only the shape of the image area of the observed subject needs to be detected.

Further, the central control unit 14 and the lens driving unit 2 have been exemplified as the focusing unit, but the present embodiment is not limited thereto, and a driving mechanism (not shown) configured to move the electronic image capturing unit 3 in the optical axis direction may be provided such that the driving mechanism is driven under the control of the central control unit 14.

Further, the configuration of the image capturing device shown in the above-described embodiment is an example and is not limited thereto, and may be arbitrarily changed as appropriate and only needs to comprise the image capturing device, the detection unit, an area setting unit, and a focusing unit.

In addition, in the above-described embodiment, the functions as the detection unit, the area setting unit, and the focusing unit are embodied by driving of the AF processing unit 7 under the control of the central control unit 14, but are not limited thereto, and may be configured such that a predetermined program, for example, is executed by the central control unit 14.

That is, programs including a detection process routine, an area setting process routine, and a focusing process routine are stored in the program memory 13 that stores programs. Further, the CPU of the central control unit 14 may be configured to function as a detection unit configured to detect the shape of an image area (such as the image areas A1, A2, or A3) of an observed subject (such as the observed subject S1, S2, or S3) to be focused in a picked-up image (such as the picked-up image G1, G2, or G3) picked up by an image capturing unit, by the detecting process routine. Further, by the area setting process unit, the CPU of the central control unit 14 may be configured to function as an area setting unit that sets a plurality of contrast evaluation areas according to the shape of an image area (such as the image area A1, A2, or A3) of the observed subject (such as the observed subject S1, S2, or S3) detected by the detection process routine. Further, by the focusing control process routine, the CPU of the central control unit 14 may be configured to function as a focusing unit that causes the image capturing unit to focus based on image data in the contrast evaluation area set by the area setting process routine.

What is claimed is:

1. An image capturing device comprising:
    an image capturing unit configured to capture an image;
    a detection unit configured to detect a shape of an image area of an observed subject to be focused in the image captured by the image capturing unit;
    an area setting unit configured to set one or more contrast evaluation areas according to the shape of the image area detected by the detection unit;
    a focusing unit configured to cause the image capturing unit to focus based on image data in the contrast evaluation areas set by the area setting unit; and
    a determining unit configured to determine numbers of the contrast evaluation areas in vertical and horizontal directions according to length ratios in vertical and horizontal directions of the image area;
    wherein the area setting unit is configured to set the contrast evaluation areas with a same shape according to the shape of the image area, and
    wherein the area setting unit is configured to set the contrast evaluation areas side by side.

2. The image capturing device according to claim 1, wherein the area setting unit is configured to set the contrast evaluation areas with a rectangular shape side by side.

3. The image capturing device according to claim 1, wherein the detection unit is configured to further detect a dimension of the image area, and wherein
    the determining unit is configured to determine the numbers of the contrast evaluation areas in the vertical and horizontal directions according to a dimension of an assumed contrast evaluation area set based on the shape and a dimension of the image area.

4. The image capturing unit according to claim 3, further comprising a calculating unit configured to calculate the dimension of the contrast evaluation area according to the numbers of the contrast evaluation areas in the vertical and horizontal directions determined by the determining unit.

5. The image capturing unit according to claim 4, wherein the detection unit is configured to further detect a dimension of the observed subject, and
    the calculating unit is configured to calculate a dimension of the contrast evaluation area based on the shape and the dimension of the image area, and the numbers of the contrast evaluation areas in the vertical and horizontal directions determined by the determining unit.

6. The image capturing device according to claim 1, wherein the detection unit is configured to detect a dimension of the image area, and further comprises a determining unit configured to determine whether the dimension of the image area is greater than a minimum dimension of the contrast evaluation areas, and wherein
    the area setting unit is configured to set the contrast evaluation areas when the dimension of the image area is greater than the minimum dimension, and sets one contrast evaluation area when the dimension of the image area is equal to or smaller than the minimum dimension.

7. The image capturing device according to claim 1, further comprising:
    a subject setting unit configured to set a minimum rectangle surrounding the image area of the observed subject as an assumed shape of the image area of the observed subject;
    an area determining unit configured to determine whether the contrast evaluation areas include the image area of the observed subject at a ratio equal to or greater than a predetermined ratio based on the assumed shape of the image area; and
    a removal unit configured to remove a contrast evaluation area determined as not including the image area of the observed subject at a ratio equal to or greater than the predetermined ratio from an evaluation target.

8. The image capturing device according to claim 1, wherein
    the detection unit is configured to sequentially detect the shape of the image area of the observed subject; and
    the area setting unit is configured to set the contrast evaluation areas according to the shape of the image area of the observed subject sequentially detected by the detection module.

9. The image capturing device according to claim 1, wherein the area setting unit is configured to set the contrast evaluation area by giving priority to a vertical direction over a horizontal direction of the image area of the observed subject.

10. An image capturing device comprising:
    an image capturing unit configured to capture an image;
    a detection unit configured to detect a shape of an image area of an observed subject to be focused in the image captured by the image capturing unit;
    an area setting unit configured to set one or more contrast evaluation areas according to the shape of the image area detected by the detection unit; and
    a focusing unit configured to cause the image capturing unit to focus based on image data in the contrast evaluation areas set by the area setting unit,
    wherein the area setting unit is configured to set a contrast evaluation area overlapping with an edge portion of the image area of the observed subject.

11. The image capturing device according to claim 10, wherein the detection unit is configured to detect a dimension of the image area, and further comprises a determining unit configured to determine whether the dimension of the image area is greater than a minimum dimension of the contrast evaluation areas, and wherein
    the area setting unit is configured to set the contrast evaluation areas when the dimension of the image area is greater than the minimum dimension, and sets one contrast evaluation area when the dimension of the image area is equal to or smaller than the minimum dimension.

12. The image capturing device according to claim 10, further comprising:
    a subject setting unit configured to set a minimum rectangle surrounding the image area of the observed subject as an assumed shape of the image area of the observed subject;
    an area determining unit configured to determine whether the contrast evaluation areas include the image area of the observed subject at a ratio equal to or greater than a predetermined ratio based on the assumed shape of the image area; and
    a removal unit configured to remove a contrast evaluation area determined as not including the image area of the observed subject at a ratio equal to or greater than the predetermined ratio from an evaluation target.

13. An image capturing device comprising:
an image capturing unit configured to capture an image;
a detection unit configured to detect a shape of an image area of an observed subject to be focused in the image captured by the image capturing unit;
an area setting unit configured to set one or more contrast evaluation areas according to the shape of the image area detected by the detection unit; and
a focusing unit configured to cause the image capturing unit to focus based on image data in the contrast evaluation areas set by the area setting unit,
wherein the focusing control unit is configured to cause the image capturing unit to focus by adopting image data in a contrast evaluation area which is included in the contrast evaluation areas, in which detection precision of a contrast gradient of image data in each of the evaluation areas is equal to or greater than a predetermined value, and which includes a peak contrast in a distance closest to the image capturing device.

14. The image capturing device according to claim 13, wherein the detection unit is configured to detect a dimension of the image area, and further comprises a determining unit configured to determine whether the dimension of the image area is greater than a minimum dimension of the contrast evaluation areas, and wherein
the area setting unit is configured to set the contrast evaluation areas when the dimension of the image area is greater than the minimum dimension, and sets one contrast evaluation area when the dimension of the image area is equal to or smaller than the minimum dimension.

15. The image capturing device according to claim 13, further comprising:
a subject setting unit configured to set a minimum rectangle surrounding the image area of the observed subject as an assumed shape of the image area of the observed subject;
an area determining unit configured to determine whether the contrast evaluation areas include the image area of the observed subject at a ratio equal to or greater than a predetermined ratio based on the assumed shape of the image area; and
a removal unit configured to remove a contrast evaluation area determined as not including the image area of the observed subject at a ratio equal to or greater than the predetermined ratio from an evaluation target.

16. An image capturing method for an image capturing unit, the method comprising:
detecting a shape of an image area of an observed subject to be focused in the image captured by the image capturing unit;
setting one or more contrast evaluation areas according to the detected shape of the image area;
causing the image capturing unit to focus based on image data in the set contrast evaluation areas; and
determining numbers of the contrast evaluation areas in vertical and horizontal directions according to length ratios in vertical and horizontal directions of the image area,
wherein the setting of the one or more contrast evaluation areas further comprises setting the contrast evaluation areas with a same shape according to the shape of the image area and setting the contrast evaluation areas side by side.

17. A non-transitory computer readable medium storing a computer program for controlling an image capturing unit, the program comprising:
detecting a shape of an image area of an observed subject to be focused in the image captured by the image capturing unit;
setting one or more contrast evaluation areas according to the detected shape of the image area;
causing the image capturing unit to focus based on image data in the set contrast evaluation areas; and
determining numbers of the contrast evaluation areas in vertical and horizontal directions according to length ratios in vertical and horizontal directions of the image area,
wherein the setting of the one or more contrast evaluation areas further comprises setting the contrast evaluation areas with a same shape according to the shape of the image area and setting the contrast evaluation areas side by side.

18. An image capturing method for an image capturing unit, comprising:
capturing an image;
detecting a shape of an image area of an observed subject to be focused in the image captured by the image capturing unit;
setting one or more contrast evaluation areas according to the shape of the image area; and
causing the image capturing unit to focus based on image data in the contrast evaluation areas,
wherein the setting the one or more contrast evaluation areas further comprises setting a contrast evaluation area overlapping with an edge portion of the image area of the observed subject.

19. A non-transitory computer readable medium storing a computer program for controlling an image capturing unit, comprising:
capturing an image;
detecting a shape of an image area of an observed subject to be focused in the image captured by the image capturing unit;
setting one or more contrast evaluation areas according to the shape of the image area; and
causing the image capturing unit to focus based on image data in the contrast evaluation areas,
wherein the setting the one or more contrast evaluation areas further comprises setting a contrast evaluation area overlapping with an edge portion of the image area of the observed subject.

20. An image capturing method for an image capturing device, comprising:
capturing an image;
detecting a shape of an image area of an observed subject to be focused in the image;
setting one or more contrast evaluation areas according to the shape of the image area; and
causing the image capturing device to focus based on image data in the contrast evaluation areas,
wherein the causing the image capturing device to focus further causes the image capturing device to adopt image data in a contrast evaluation area which is included in the contrast evaluation areas, in which detection precision of a contrast gradient of image data in each of the evaluation areas is equal to or greater than a predetermined value, and which includes a peak contrast in a distance closest to the image capturing device.

21. A non-transitory computer readable medium storing a computer program for controlling an image capturing device, comprising:

capturing an image;

detecting a shape of an image area of an observed subject to be focused in the image;

setting one or more contrast evaluation areas according to the shape of the image area; and causing the image capturing device to focus based on image data in the contrast evaluation areas, wherein the causing the image capturing device to focus further causes the image capturing device to adopt image data in a contrast evaluation area which is included in the contrast evaluation areas, in which detection precision of a contrast gradient of image data in each of the evaluation areas is equal to or greater than a predetermined value, and which includes a peak contrast in a distance closest to the image capturing device.

* * * * *